(12) United States Patent
Jung et al.

(10) Patent No.: US 12,248,571 B2
(45) Date of Patent: Mar. 11, 2025

(54) ON-DEVICE ANDROID MALWARE DETECTION METHOD BASED ON ADAPTIVE MODEL THROUGH TRANSFER LEARNING, AND RECORDING MEDIUM AND APPARATUS FOR PERFORMING THE SAME

(71) Applicant: Foundation of Soongsil University-Industry Cooperation, Seoul (KR)

(72) Inventors: Soohwan Jung, Seoul (KR); Hyunseok Shim, Seoul (KR); Songi Gwak, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 178 days.

(21) Appl. No.: 17/888,983

(22) Filed: Aug. 16, 2022

(65) Prior Publication Data

US 2023/0177156 A1 Jun. 8, 2023

Related U.S. Application Data

(63) Continuation-in-part of application No. PCT/KR2022/004665, filed on Mar. 31, 2022.

(30) Foreign Application Priority Data

Jun. 7, 2021 (KR) ........................ 10-2021-0073580

(51) Int. Cl.
*G06F 21/56* (2013.01)

(52) U.S. Cl.
CPC ...... *G06F 21/563* (2013.01); *G06F 2221/033* (2013.01)

(58) Field of Classification Search
CPC .. G06F 21/563; G06F 2221/033; G06F 9/445; G06F 11/36; G06F 21/56;
(Continued)

(56) References Cited

U.S. PATENT DOCUMENTS

| 8,844,038 B2 * | 9/2014 | Niemela | ............... H04L 63/145 |
| | | | 713/188 |
| 10,250,617 B1 * | 4/2019 | Gardner | ................... G06N 3/08 |

(Continued)

FOREIGN PATENT DOCUMENTS

| KR | 10-1337215 B1 | 12/2013 |
| KR | 10-2168496 B1 | 10/2020 |
| KR | 10-2180098 B1 | 11/2020 |

OTHER PUBLICATIONS

Korean Office Action mailed Sep. 30, 2022, issued to Korean Application No. 10-2021-0073580.

(Continued)

*Primary Examiner* — Joe Chacko
(74) *Attorney, Agent, or Firm* — Stein IP LLC (57) ABSTRACT

Provided is an on-device Android malware detection method based on an adaptive model through transfer learning, including: determining whether an application is malicious or unfavorable from a list of applications installed on a device; decompiling, in the device, an Android package (APK) of the application installed on the device; transmitting the determined list and the decompiled APK file to a server in order to generate a head model in the server and use the generated head model for the transfer learning with a base model; performing malware analysis in the device using a transfer learning model received from the server for an application newly installed on the device; and providing a malware analysis result to a user through the device as a result, and since the malware analysis is performed on the (Continued)

device, it is possible to ensure the availability and real-time performance of enabling analysis outside of a network range.

9 Claims, 8 Drawing Sheets

(58) Field of Classification Search
CPC .. G06F 21/562; G06F 21/566; G06F 9/44589; G06F 11/3604; G06N 3/08
See application file for complete search history.

(56) References Cited

U.S. PATENT DOCUMENTS

| | | | | |
|---|---|---|---|---|
| 11,526,601 | B2* | 12/2022 | Rouhani | G06N 3/088 |
| 2012/0222120 | A1* | 8/2012 | Rim | G06F 21/566 |
| | | | | 726/24 |
| 2016/0057159 | A1* | 2/2016 | Yin | H04L 63/145 |
| | | | | 726/23 |
| 2018/0189489 | A1* | 7/2018 | Zhang | G06F 21/566 |
| 2019/0042743 | A1 | 2/2019 | Chen | |
| 2019/0230107 | A1* | 7/2019 | De Sapio | H04L 63/145 |
| 2019/0272375 | A1 | 9/2019 | Chen | |
| 2020/0344261 | A1* | 10/2020 | Yi | H04L 63/1433 |
| 2021/0073377 | A1 | 3/2021 | Coull et al. | |

OTHER PUBLICATIONS

Ruitao Feng et al., "MobiDroid: A Performance-Sensitive Malware Detection System on Mobile Platform" (Nov. 2019).

Pavel Senchanka, "Example on-device model personalization with TensorFlow Lite"(Apr. 2021), https://web.archive.org/web/20210414171249/https://blog.tensorflow.org/2019/12/example-on-device-modelpersonalization.html.

Martin Sweeney, "Decompile and Modify APKs on the go with APKTool for Android"(Nov. 2020), https://web.archive.org/web/20201112034032/https://www.xda-developers.com/decompile-and-modify-apks-on-the-go-with-apktool-for-android/.

Hyunseok Shim et al. "Transfer Learning based Adaptive Model for Serverless On-Device Android Malware Detection", Korea Institute of Information Security & Cryptology, Conference on Information Security and Cryptography-Winter 2020 (Nov. 28, 2020).

Mohammad Al-Fawa'reh et al."Malware Detection by Eating a Whole APK". Published in: 2020 15th International Conference for Internet Technology and Secured Transactions (ICITST). Princess Sumaya University for Technology Amman, Jordan.

* cited by examiner

```
if (OSDetection.isMacOSX()) aaptBinary
    = Jar.getResourceAsFile("/prebuilt/macosx/" +
    aaptVersion, AaptManager.class);
else if (OSDetection.isUnix()) aaptBinary
    = Jar.getResourceAsFile("/prebuilt/linux/" +
    aaptVersion, AaptManager.class);
else if (OSDetection.isWindows()) aaptBinary
    = Jar.getResourceAsFile("/prebuilt/windows/" +
    aaptVersion + ".exe", AaptManager.class);
else throw new BrutException("Cloud not identify
platform: " + OSDetection.returnOS());  //Disable this
line
```

FIG. 4

```
toco --input_file=converted_model.pb
--output_file=converted_model.tflite
--input_format=TENSORFLOW_GRAPHDEF
--output_format=TFLITE --input_shape=1,12,12,1
--input_array=input --output_array=output
--inference_type=FLOAT
```

ON-DEVICE ANDROID MALWARE DETECTION METHOD BASED ON ADAPTIVE MODEL THROUGH TRANSFER LEARNING, AND RECORDING MEDIUM AND APPARATUS FOR PERFORMING THE SAME

CROSS-REFERENCE TO RELATED APPLICATION(S)

The present application is a continuation-in-part of international patent application No. PCT/KR2022/004665 filed on Mar. 31, 2022, and claims priority to Korean patent application No. 10-2021-0073580 filed on Jun. 7, 2021, the disclosures of which are hereby incorporated by reference in their entirety.

TECHNICAL FIELD

The present invention relates to an on-device Android malware detection method based on an adaptive model through transfer learning, and a recording medium and an apparatus for performing the same, and more particularly, to a serverless and on-device technology of performing transfer learning on a base model to generate a model optimized for a user environment and performing malware by delivering the transferred model to a user device.

BACKGROUND ART

Since the first version of Android was released in 2008, studies on Android malware analysis have been steadily conducted over the past few years. Nevertheless, Android malware has steadily increased, and such malware exists in various categories.

On the other hand, depending on types of users, criteria for frequently accessed application categories or malware are different. For example, when a type of a device used by specific user is geared toward games, it is highly likely to be game-type malware. In addition, for adware type malware, determination of malware depends on a user's criteria, and thus malware detection needs to be optimized for the user environment.

In general, the analysis of Android malware is divided into dynamic analysis based on Android runtime (ART) and static analysis based on Android package (APK) file information.

Both analysis methods have come to detect malware through pattern analysis using machine learning techniques in studies. On the other hand, the studies aim to analyze the received APK on the server, resulting in an increase in a load on a server side and deterioration of real-time performance and availability.

The existing deep-learning-based Android malware analysis method is not optimized for a user environment because models are built through various types of malware. Also, according to the existing analysis method, an analysis server is in charge of all analyses, and thus there is a problem that the cost of service providers increases and availability and real-time performance deteriorate.

Therefore, studies related to on-device analysis for performing in-device analysis have recently been conducted. The studies do not go through a server, and in general, analysis is performed through Tensorflow Lite in the device.

Recent studies have seen malware detection performed through deep learning in a device for real-time performance and fast responsiveness. However, since the Tensorflow Lite does not provide a model building function in the device, only inference using the generated model is possible. Therefore, only the analysis in the device using the existing model is possible, which has nothing to do with optimization with a user device.

In addition, other studies implemented a lightweight on-device detection model have been conducted to build an in-device model. The Tensorflow Lite was not used to build the model in the on-device environment, and the model was generated through broad learning. However, in this case, it is necessary to generate a model from the beginning to the end in each device, and since the data bias and the quality level of data may not be ensured, reliability problems occur in the real environment.

DISCLOSURE

Technical Problem

The present invention is directed to providing an on-device Android malware detection method based on an adaptive model through transfer learning.

The present invention is also directed to providing a recording medium on which a computer program for performing an on-device Android malware detection method based on an adaptive model through transfer learning is recorded.

The present invention is also directed to providing an apparatus for performing the on-device Android malware detection method based on an adaptive model through transfer learning.

Technical Solution

One aspect of the present invention provides an on-device Android malware detection method based on an adaptive model through transfer learning, including: determining whether an application on a list of applications installed on a device is malicious or unfavorable; decompiling, in the device, an Android package (APK) of the application installed on the device; transmitting the determined list and the decompiled APK file to a server in order to generate a head model in the server and use the generated head model for the transfer learning with a base model; performing malware analysis in the device using a transfer learning model received from the server for an application newly installed on the device; and providing a malware analysis result to a user through the device.

In the determining of whether the application on the list of applications installed on the device is malicious or unfavorable, when the application is selected by the user, it may be determined that the application is a malicious or unfavorable application.

The base model may be based on a convolutional neural network (CNN) using a two-dimensional (2D) matrix as input data.

The base model may be generated based on a permission of a manifest file or may be generated based on application programming interface (API) signature information defined in the APK.

The decompiling, in the device, of the APK of the application installed on the device may run in an Android environment by removing branch processing for each operating system of APKTool.

The on-device Android malware detection method may further include: generating a new transfer learning model by communicating with the server according to the user's needs.

Another aspect of the present invention provides a computer-readable recording medium on which a computer program for performing the on-device Android malware detection method based on an adaptive model through transfer learning is recorded.

Still another aspect of the present invention provides an on-device Android malware detection apparatus based on an adaptive model through transfer learning, including: a user environment reflection unit that determines whether an application on a list of applications installed on the device is malicious or unfavorable; a decompilation unit that decompiles, in the device, an Android package (APK) of the application installed on the device; a communication unit that transmits the determined list and the decompiled APK file to a server in order to generate a head model in the server and use the generated head model for the transfer learning with a base model; an analysis unit that performs malware analysis in the device using a transfer learning model received from the server for an application newly installed on the device; and a result providing unit that provides a malware analysis result to a user through the device.

When the user environment reflection unit is selected by the user, it may be determined that the application is a malicious or unfavorable application.

The base model may be based on a convolutional neural network (CNN) using a two-dimensional (2D) matrix as input data.

The base model may be generated based on a permission of a manifest file or generated based on the API signature information defined in the APK.

The decompilation unit may run in an Android environment by removing branch processing for each operating system of APKTool.

The communication unit may communicate with the server to generate a new transfer learning model according to the user's needs.

Advantageous Effects

According to an on-device Android malware detection method based on an adaptive model through transfer learning, it is possible to provide a model optimized for user criteria through one communication with a server and then perform all analyses at a client end. Therefore, since there is no risk of personal information leakage and the availability and real-time performance of enabling analysis outside a network range are ensured, it is possible to solve the problem of availability and real-time performance of the existing analysis system.

MODES OF THE INVENTION

Exemplary embodiments of the present invention will be described in detail with reference to the accompanying drawings. These embodiments will be described in detail for those skilled in the art in order to practice the present invention. It should be appreciated that various exemplary embodiments of the present invention are different from each other, but do not have to be exclusive. For example, specific shapes, structures, and characteristics described in the present specification may be implemented in another exemplary embodiment without departing from the spirit and the scope of the present invention in connection with an exemplary embodiment. In addition, it should be understood that a position or an arrangement of individual components in each disclosed exemplary embodiment may be changed without departing from the spirit and the scope of the present invention. Therefore, a detailed description described below should not be construed as being restrictive. In addition, the scope of the present invention is defined only by the accompanying claims and their equivalents if appropriate. Similar reference numerals will be used to describe the same or similar functions throughout the accompanying drawings.

The term "unit" is defined herein as having its broadest definition to ordinary skill in the art, including software including instructions executable in a non-transitory computer-readable medium that would perform the associated function when executed, a circuit designed to perform the associated function, hardware designed to perform the associated function, or a combination of software, a circuit, or hardware designed to perform the associated function.

Further, it is to be understood that all detailed descriptions mentioning specific embodiments of the present disclosure as well as principles, aspects, and embodiments of the present disclosure are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that, for example, block diagrams of the present specification illustrate a conceptual aspect of an illustrative circuit for embodying a principle of the present disclosure. Therefore, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute software in connection with appropriate software as well as dedicated hardware. When the functions are provided by the processors, they may be provided by a single dedicated processor, a single shared processor, or a plurality of individual processors, and some of them may be shared with each other.

In addition, the explicit use of terms presented as the processor, control, or similar concepts should not be interpreted exclusively by quoting hardware capable of executing software, but should be understood to implicitly include, without limitation, digital signal processor (DSP) hardware, a ROM for storing software, a RAM, and a non-volatile memory. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a method demanded by the claims in the present disclosure defined by the claims, any means capable of providing these functions are equivalent to means recognized from the present specification.

Hereinafter, exemplary embodiments of the present invention will be described in more detail with reference to the accompanying drawings.

Figure 1:
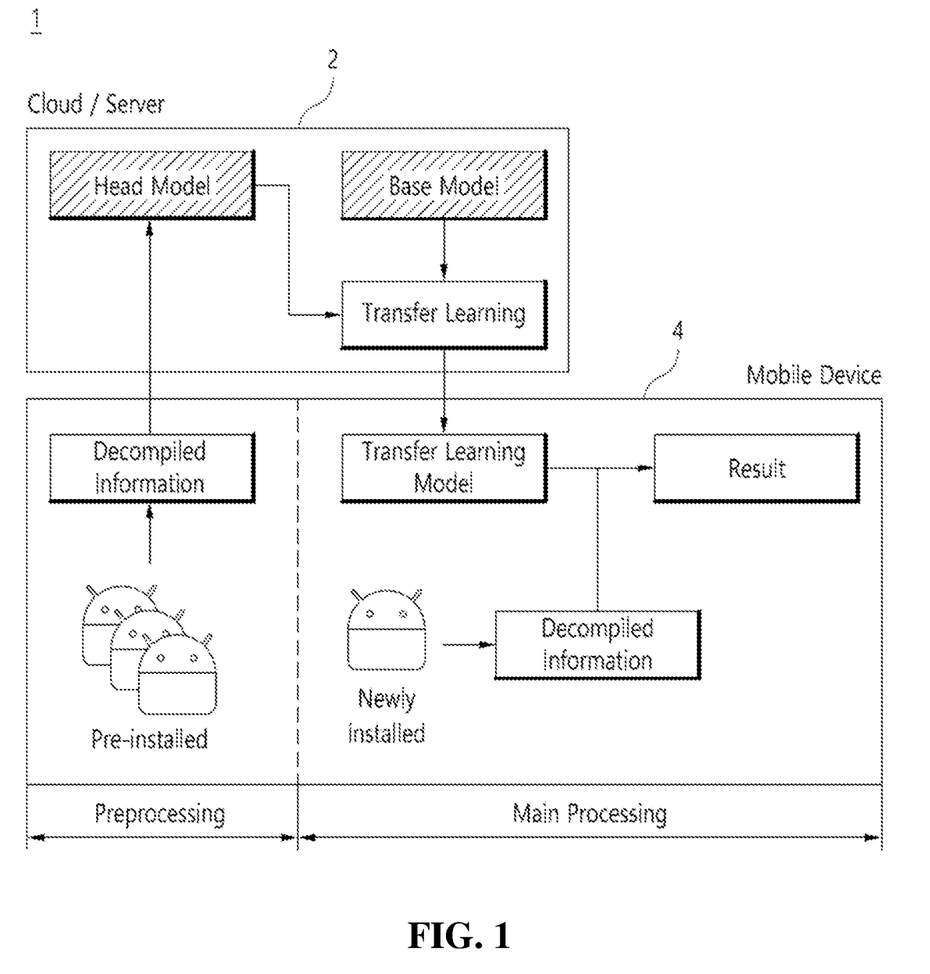
FIG. 1 is a conceptual diagram of an analysis system for performing model retraining through transfer learning of the present invention.
Figure 2:
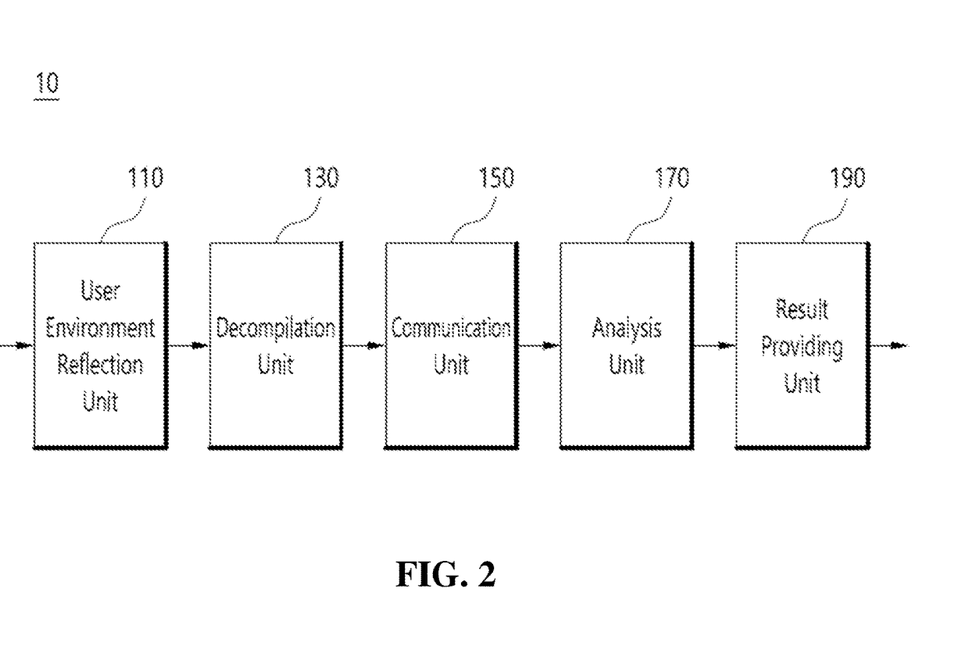
FIG. 2 is a block diagram of an on-device Android malware detection apparatus based on an adaptive model through transfer learning according to an embodiment of the present invention.

FIG. 1 is a conceptual diagram of an analysis system for performing model retraining through transfer learning of the present invention. FIG. 2 is a block diagram of an on-device Android malware detection apparatus based on an adaptive model through transfer learning according to an embodiment of the present invention.

Referring to FIG. 1, the present invention provides an analysis system 1 for performing malware analysis in a user device 4 and model retraining through transfer learning. The analysis system 1 provides a model optimized for user criteria through only one communication with a server 2 or a cloud, and then performs all analyses at a client end.

Therefore, since there is no risk of personal information leakage, and the availability and real-time performance of enabling analysis outside a network range are ensured, it is possible to solve the problem of availability and real-time performance of the existing analysis system.

When a user first installs the analysis system 1, the user may determine whether an application on a list of applications installed on the device 4 is malicious or unfavorable. The determined list is transmitted to the server 2 to generate a head model, which is utilized for transfer learning with the base model.

In this case, when an application is not selected by the user, the application is considered normal, and when an application is selected, the application is considered malicious and this may be reflected in a transfer learning model. A preprocessing part in FIG. 1 is completed by generating the corresponding transfer learning model.

In the pre-processing process, since the analysis system 1 aims to run in the device 4, decompilation of an Android package (APK) needs to be performed in the device 4.

Then, the analysis system 1 transfers the transfer learning model to the device 4 and starts the analysis in the device 4, and this process corresponds to a main processing part in FIG. 1. Then, the analysis of the newly installed application is performed.

This analysis process is performed in an on-device environment and is an analysis in the device 4 that does not go through the server 2. When the analysis is completed, the analysis result is transferred to the user, and a new transfer learning model may be generated by communicating with the server 2 according to the user's needs.

An on-device Android malware detection apparatus 10 (hereinafter, apparatus) based on an adaptive model through transfer learning according to the present invention provides a model optimized for the user criteria through only one communication with the server, and then performs analysis on the client end, that is, the device.

Referring to FIG. 2, the apparatus 10 according to the present invention includes a user environment reflection unit 110, a decompilation unit 130, a communication unit 150, an analysis unit 170, and a result providing unit 190. The apparatus 10 may be the device 4 of FIG. 1 or may be a part of the device 4.

The apparatus 10 of the present invention may be run with software (an application) for performing on-device Android malware detection based on an adaptive model through transfer learning installed thereon, and a configuration of the user environment reflection unit 110, the decompilation unit 130, the communication unit 150, the analysis unit 170, and the result providing unit 190 may be controlled by software for performing the on-device Android malware detection based on an adaptive model through transfer learning executed in the apparatus 10.

The apparatus 10 may be a separate terminal or a part of a module of the terminal. In addition, the configuration of the user environment reflection unit 110, the decompilation unit 130, the communication unit 150, the analysis unit 170, and the result providing unit 190 may be formed as an integrated module, or may be formed as one or more modules. However, on the other hand, each configuration may be configured as a separate module.

The apparatus 10 may be a user's mobile terminal such as a smart phone or a tablet. The apparatus 10 may be called be another term such as "device," "apparatus," "terminal," "user equipment (UE)," "mobile station (MS)," "wireless device," or "handheld device."

The user environment reflection unit 110 determines whether an application on a list of applications installed on the device is malicious or unfavorable. In an embodiment, it is possible to determine whether the application on the list of applications installed on the device is malicious or unfavorable when a user first installs the analysis system 1.

The determined list is transmitted to the server 2 to generate a head model, which is utilized for transfer learning with the base model. In this case, when an application is not selected by a user, the application is considered normal, and when an application is selected, the application is considered malicious and this may be reflected in a transfer learning model.

The decompilation unit 130 decompiles, in the device, the APK of the application installed on the device.

Figure 3:
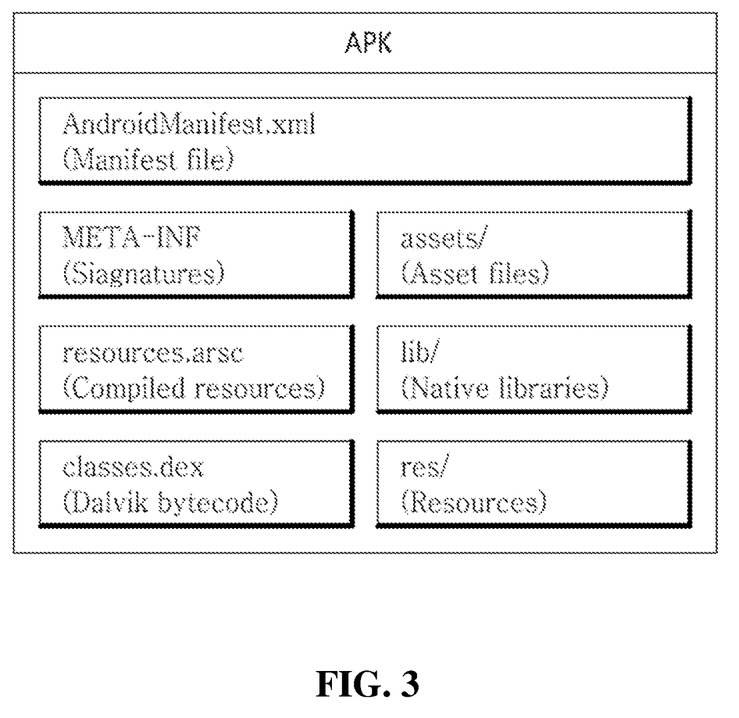
FIG. 3 is a diagram for describing an internal structure of an Android package (APK) file.

An Android application is composed of an executable file in the form of an APK file, and is divided into a Java-based classes.dex file, an AndroidManifest.xml file, a res/directory in charge of resources, a resources.arsc file in charge of id mapping of resources, etc. The components inside the APK file are as illustrated in FIG. 3.

Among them, the classes.dex file has most of a source code related to Android application functions, and can be extracted as a file with a smali extension when being decompiled.

On the other hand, the AndroidManifest.xml file does not include Android source code, but has information on attributes that configure the Android APK. This includes use permission information, a name of a declared component, etc., in addition to a package name of the APK file. Unlike the compiled classes.dex file, the AndroidManifest.xml file has a characteristic that it can be viewed immediately when the APK file is decompressed.

The communication unit 150 communicates with the server 2 and transmits the determined list and the decompiled APK file to the server 2 in order to generate the head model in the server 2 and use the generated head model for the transfer learning with the base model. In addition, the communication unit 150 receives the transfer learning model generated by the server 2.

The transfer learning is a machine learning technique of reusing a trained model in a data-rich field to build a model in a field in which learning data is lacking, and is a technique of recycling some layers of a model with good performance.

Most model learning requires a large amount of data for training and prediction, but in reality, a process of building such a dataset consumes many resources.

Therefore, it is efficient to perform fine tuning of the pre-trained model through such transfer learning and to use the reused model. In this fine-tuning process, there are a method of applying a weight of a pre-trained model to a new model and a method of reusing only some layers of the existing model.

Each of these methods has the advantage of inheriting the performance of the existing model and solving the model training problem due to insufficient data.

The analysis unit 170 performs malware analysis in the device using the transfer learning model received from the server for an application newly installed on the device. The result providing unit 190 provides the malware analysis result to the user through the device.

Since the present invention aims to run in a device, the decompilation of the APK needs to be performed in the device. Therefore, APKTool, which is an APK decompiler, may be used after being modified to be executable within Android.

Figure 4:
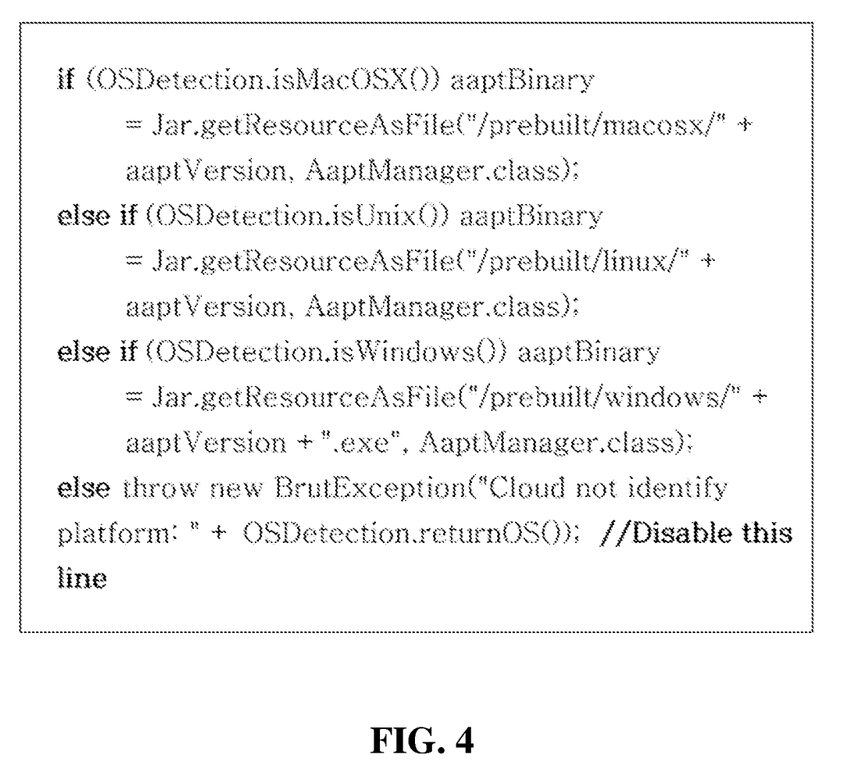
FIG. 4 is a diagram illustrating an example of branch processing for each operating system (OS) in AaptManager.

The APKTool is basically set to be executable only in Linux, Mac, and Windows environments, but can run in the Android environment when the branch processing related to an operating system in AaptManager is removed as illustrated in FIG. 4.

The decompilation in the Android device causes a problem of insufficient resources or some dependencies for decompilation. On the other hand, a part with such decompilation errors occurs only in uncompiled resources or layout-related resources in the res/directory.

Therefore, the classes.dex file and the manifest file containing the characteristics of the application function can be decompiled normally.

Tensorflow Lite supports the transfer learning based on the pre-trained base model. The Tensorflow Lite model receives a model with .tflite extension as an input. To this end, an h5 model trained through the existing karas needs to be converted into a tflite type model.

For the conversion between these models, for example, an open source model conversion tool, Toco, may be used. For example, since Toco may convert a pb file, which is binary representing a model structure, into the tflite type model, the h5 model needs to be first converted into the pb file.

Figure 5:
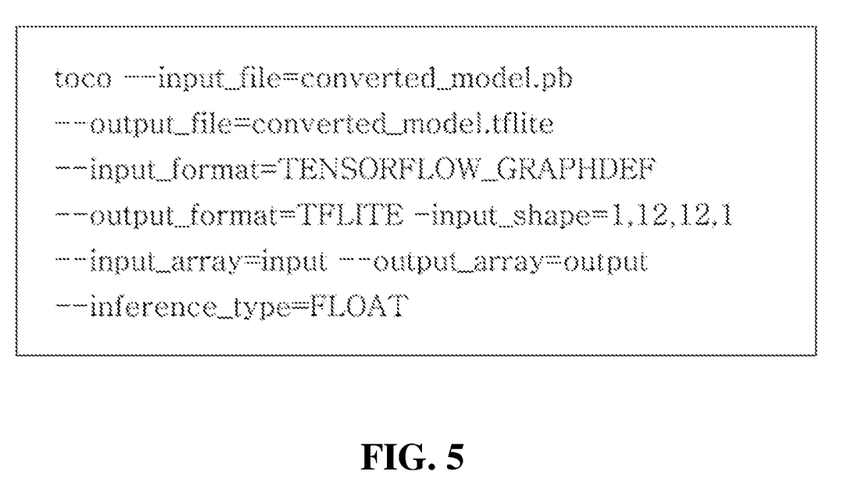
FIG. 5 is an exemplary diagram illustrating conversion of a pb file to a tflite model using Toco.

The converted pb file is converted into tflite once again. To this end, feature set information of the input data needs to be specified. This is as illustrated in FIG. 5, and by inputting TELITE to an output_format option, the conversion into a model available in the Tensorflow Lite may be performed.

Because the base model is based on a convolutional neural network (CNN), a two-dimensional-matrix (2d-matrix) may be used as input data. Currently, the number of permissions defined in an Android document is 165. Among them, 144 pieces of data can be used as input data, excluding 21 permissions that are rarely used.

Each permission is marked as 1 when usage is defined in the APK's manifest and is marked as 0 when usage not defined. Therefore, all the APKs used for learning and testing use data converted into a 12*12 matrix, and include a process of flipping 0 and 1 into data in order to improve accuracy.

The base model may be generated based on the permission of the manifest file, or generated based on the API signature information defined in the APK.

For the evaluation of the system 1 of the present invention, a terminal using the Android 10 operating system was used, and a transfer learning server based on the Ubuntu 16.0.4 operating system was implemented.

The evaluation is based on simulation, and after the transfer learning is performed on the application designated by a user, the evaluation of all applications is performed in the terminal.

The data set for evaluation is 600 malicious APKs and 300 normal APKs collected in a total of 4 categories. In each category, the model was generated using only two categories, and then the fine tuning was performed using the two categories in turn for the transfer learning.

Figure 6:
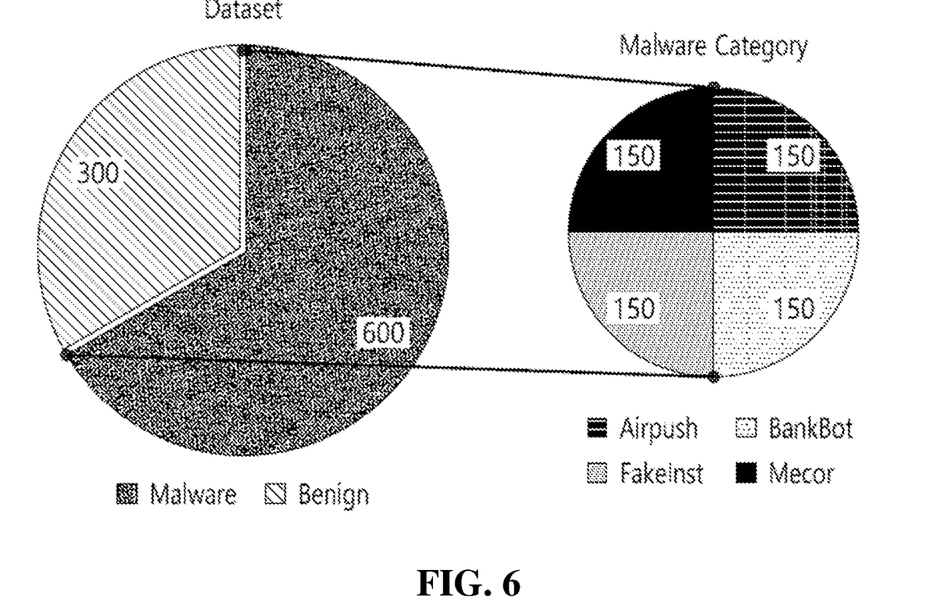
FIG. 6 is a diagram illustrating a configuration of an entire APK data set for evaluation of the present invention.

400 APKs, which is 44% of the total data set, were used to generate the base model, and then the fine tuning was performed using 150 and 300 APKs. The configuration of all this data is as illustrated in FIG. 6.

In the first learning, the training is done with all APKs and 200 normal apps of BankBot and Mecor categories, and the base model is generated without the transfer learning. For the subsequent evaluation, APKs of categories not used for training and APKs of 100 normal apps were used.

In each evaluation result, since normal apps have similar characteristics, even when a small number of samples are trained, the accuracy is 94.3%, but in the case of malicious apps, the accuracy is 88.3% because of predicting features of categories that are trained. Thereafter, for the transfer learning, only 100 out of 150 APKs in the malicious app category were used for transfer learning, and 50 APKs were used for testing.

Figure 7:
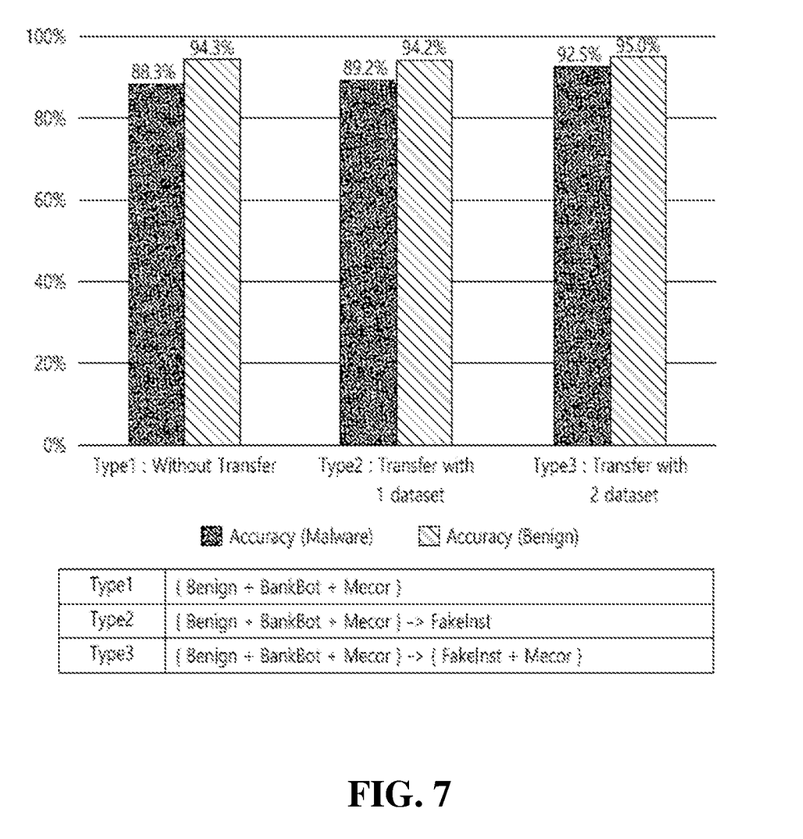
FIG. 7 is a diagram illustrating performance results of transfer learning when the present invention is used.

Referring to FIG. 7, when the fine tuning is performed through the transfer learning, the detection accuracy for malware rises to 89.2%, and when transfer learning is performed on all categories, the accuracy rises to about 92.5%. The overall model accuracy shows an improvement of 2.45% on average.

According to the present invention, model retraining is performed through the transfer learning and malware detection in an Android device using the Tensorflow Lite. To this end, the Android APK manifest file is parsed and permission definitions are extracted, and the conversion into a two-dimensional matrix is performed in the Android device. The evaluation showed that the improvement of 2.45% was obtained in terms of accuracy compared to before the transfer learning.

Figure 8:
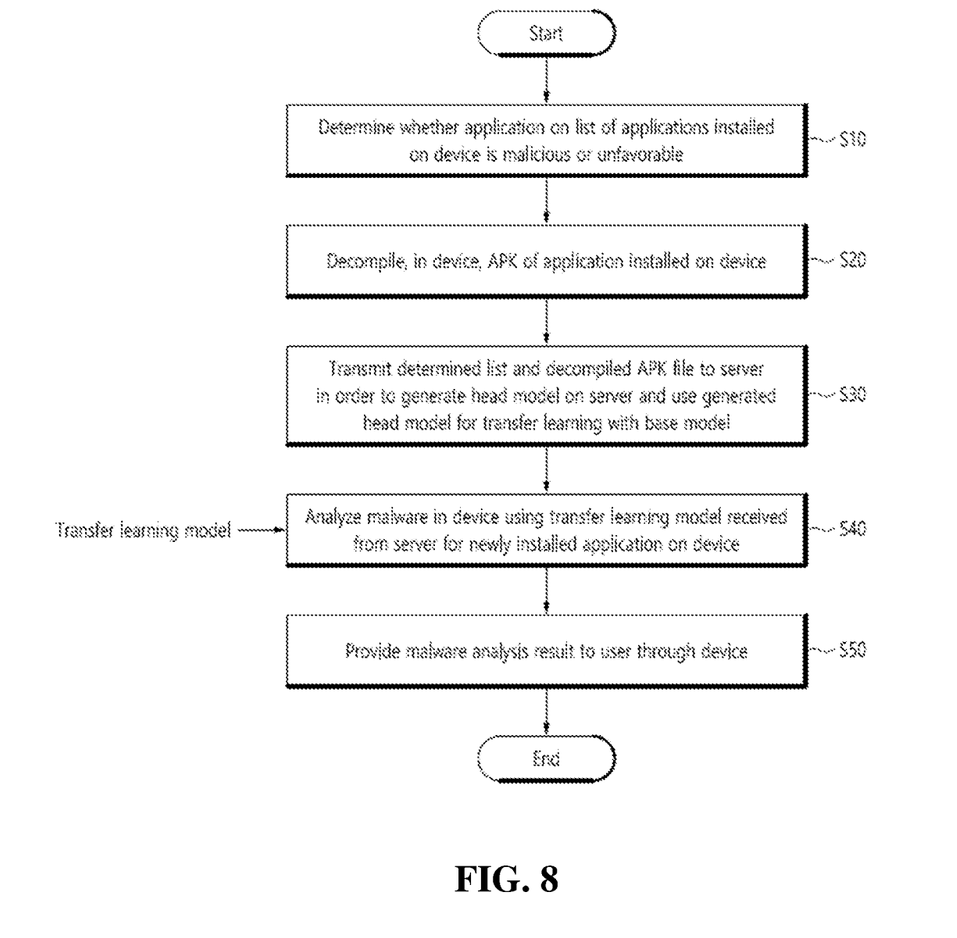
FIG. 8 is a flowchart of an on-device Android malware detection method based on an adaptive model through transfer learning according to an embodiment of the present invention.

FIG. 8 is a flowchart of an on-device Android malware detection method based on an adaptive model through transfer learning according to an embodiment of the present invention.

The on-device Android malware detection method based on an adaptive model through transfer learning according to the present embodiment may proceed in substantially the same configuration as the system 1 of FIG. 1 and the apparatus 10 of FIG. 2. Accordingly, the same components as the system 1 of FIG. 1 and the apparatus 10 of FIG. 2 are denoted by the same reference numerals, and repeated description thereof will be omitted.

In addition, the on-device Android malware detection method based on the adaptive model through transfer learning according to the present embodiment may be executed by software (an application) for performing the on-device Android malware detection based on an adaptive model through transfer learning.

The present invention provides a model optimized for user criteria through only one communication with the server, after which analysis is performed at the client end, that is, in the device.

Therefore, since there is no risk of personal information leakage, and the availability and real-time performance of enabling analysis outside a network range are ensured, it is possible to solve the problem of availability and real-time performance of the existing analysis system.

Referring to FIG. 8, the on-device Android malware detection method based on an adaptive model through transfer learning according to the present embodiment includes determining whether an application on a list of applications installed on the device is malicious or unfavorable (operation S10).

In this case, when an application is selected by a user, it may be determined that the application is a malicious or unfavorable application. The determined list is transmitted to server 2 to generate a head model, which is utilized for transfer learning with the base model.

The Android package (APK) of the application installed on the device is decompiled in the device (operation S20).

The Android application is composed of an executable file in the form of the APK file, and is divided into a Java-based classes.dex file, an AndroidManifest.xml file, a res/directory in charge of resources, a resources.arsc file in charge of id mapping of resources, etc.

Among them, the classes.dex file has most of a source code related to Android application functions, and can be extracted as a file with a smali extension when being decompiled.

On the other hand, the AndroidManifest.xml file does not include Android source code, but has information on attributes that configure the Android APK. This includes use permission information, a name of a declared component, etc., in addition to a package name of the APK file. Unlike the compiled classes.dex file, the AndroidManifest.xml file has a characteristic that it can be viewed immediately when the APK file is decompressed.

The determined list and the decompiled APK file are transmitted to a server in order to generate the head model in the server and use the generated head model for the transfer learning with the base model (operation S30). Thereafter, the transfer learning model generated in the server is generated.

In an embodiment, the base model may be based on a CNN using a 2D matrix as input data. In addition, the base model may be generated based on the permission of the manifest file or based on the API signature information defined in the APK.

The transfer learning is a machine learning technique of reusing a trained model in a data-rich field to build a model in a field in which training data is lacking, and is a technique of recycling some layers of a model with good performance.

Most model learning requires a large amount of data for training and prediction, but in reality, a process of building such a dataset consumes many resources.

Therefore, it is efficient to perform fine tuning of the pre-trained model through such transfer learning and to use the reused model. In this fine-tuning process, there are a method of applying a weight of a pre-trained model to a new model and a method of reusing only some layers of the existing model.

Each of these methods has the advantage of inheriting the performance of the existing model and solving the model training problem due to insufficient data.

The malware analysis is performed in the device using the transfer learning model received from the server for an application newly installed on the device (operation S40). The malware analysis result is provided to the user through the device (operation S50).

Since the present invention aims to run in a device, the decompilation of the APK needs to be performed in the device. Therefore, APKTool, which is an APK decompiler, may be used after being modified to be executable within Android.

In one embodiment, the decompilation in the device may be run in the Android environment by removing the branch processing for each operating system of the APKTool.

The decompilation in the Android device causes a problem of insufficient resources or some dependencies for decompilation. On the other hand, a part with such decompilation errors occurs only in uncompiled resources or layout-related resources in the res/directory.

Therefore, the classes.dex file and the manifest file containing the characteristics of the application function can be decompiled normally.

Tensorflow Lite supports the transfer learning based on the pre-trained base model. The Tensorflow Lite model receives a model with .tflite extension as an input. To this end, an h5 model trained through the existing karas needs to be converted into a tflite type model.

For the conversion between these models, for example, an open source model conversion tool, Toco, may be used. For example, since Toco may convert a pb file, which is binary representing a model structure, into the tflite type model, the h5 model needs to be first converted into the pb file.

The converted pb file is converted into tflite once again. To this end, feature set information of the input data needs to be specified. This is as illustrated in FIG. 5, and by inputting TELITE to an output_format option, the conversion into a model available in the Tensorflow Lite may be performed.

In one embodiment, a new transfer learning model may be created by communicating with the server according to the user's needs.

The present invention may be implemented as a serverless and on-device technology of performing transfer learning in the base model to generate a model optimized for the user environment, and detecting malware by transferring the transferred model to the user device Such an on-device Android malware detection method based on an adaptive model through transfer learning may be implemented as an application or implemented in the form of a program command that may be executed through various computer components, and recorded in a computer-readable recording medium. The computer-readable recording medium may include a program command, a data file, a data structure, or the like, alone or a combination thereof.

The program instructions recorded on the computer-readable recording medium may be especially designed and constituted for the present invention or be known to those skilled in the field of computer software.

Examples of the computer-readable recording medium may include a magnetic medium such as a hard disk, a floppy disk, or a magnetic tape; an optical medium such as a compact disk read only memory (CD-ROM) or a digital versatile disk (DVD); a magneto-optical medium such as a floptical disk; and a hardware device especially configured to store and execute program instructions, such as a ROM, a random access memory (RAM), or a flash memory.

Examples of the program instructions include a high-level language code capable of being executed by a computer using an interpreter, or the like, as well as a machine language code created by a compiler. The hardware device may be constituted to be operated as one or more software modules to perform processing according to the present invention, and vice versa.

Although embodiments of the present invention have been described hereinabove, those skilled in the art will be able to understand that the present invention may be variously modified and altered without departing from the spirit and scope of the present invention disclosed in the following claims.

INDUSTRIAL APPLICABILITY

The present invention detects malware by an on-device method through an analysis system that performs model retraining through malware analysis in a device and transfer learning, and thus can be variously applied to an Android malware detection module, an adware blocking engine, etc.

The invention claimed is:

1. An on-device Android malware detection method based on an adaptive model through transfer learning, the on-device Android malware detection method comprising:
   determining whether a list of applications installed on a device includes an application that is malicious or unfavorable;
   decompiling, in the device, an Android package (APK) file of the application installed on the device;
   transmitting the determined list and the decompiled APK file to a server, generating a head model in the server, and using the generated head model for the transfer learning with a base model;
   performing malware analysis in the device using a transfer learning model received from the server for an application newly installed on the device; and
   providing a malware analysis result to a user through the device,
   wherein, in the determining whether the list of applications installed on the device includes an application that is malicious or unfavorable, the application is determined to be a malicious or unfavorable application when the application is selected by the user, and the application is determined to be normal and reflected in a transfer learning model when the application is not selected by the userz,
   wherein the decompiling, in the device, of the APK file of the application installed on the device is run in an Android environment by removing branch processing for each operating system of APKTool.

2. The on-device Android malware detection method of claim 1, wherein the base model is based on a convolutional neural network (CNN) using a two-dimensional (2D) matrix as input data.

3. The on-device Android malware detection method of claim 1, wherein the base model is generated based on a permission of a manifest file or is generated based on application programming interface (API) signature information defined in the APK file.

4. The on-device Android malware detection method of claim 1, further comprising generating a new transfer learning model by communicating with the server according to needs of the user.

5. A non-transitory computer-readable recording medium on which a computer program for performing an on-device Android malware detection method based on an adaptive model through transfer learning, wherein the on-device Android malware detection method comprises:
   determining whether a list of applications installed on a device includes an application that is malicious or unfavorable;
   decompiling, in the device, an Android package (APK) file of the application installed on the device;
   transmitting the determined list and the decompiled APK file to a server, generating a head model in the server, and using the generated head model for the transfer learning with a base model;
   performing malware analysis in the device using a transfer learning model received from the server for an application newly installed on the device; and
   providing a malware analysis result to a user through the device,
   wherein, in the determining whether the list of applications installed on the device includes an application that is malicious or unfavorable, the application is determined to be a malicious or unfavorable application when the application is selected by the user, and the application is determined to be normal and reflected in a transfer learning model when the application is not selected by the user,
   wherein the decompiling, in the device, of the APK file of the application installed on the device is run in an Android environment by removing branch processing for each operating system of APKTool.

6. An on-device Android malware detection apparatus based on an adaptive model through transfer learning, the on-device Android malware detection apparatus comprising:
   a user environment reflection unit determining whether a list of applications installed on a device includes an application that is malicious or unfavorable;
   a decompilation unit decompiling, in the device, an Android package (APK) file of the application installed on the device;
   a communication unit transmitting the determined list and the decompiled APK file to a server in order to generate a head model in the server and use the generated head model for the transfer learning with a base model;
   an analysis unit performing malware analysis in the device using a transfer learning model received from the server for an application newly installed on the device; and
   a result providing unit providing a malware analysis result to a user through the device,
   wherein the user environment reflection unit determines the application to be a malicious or unfavorable application when the application is selected by the user, and the user environment reflection unit determines the application to be normal and reflects it in a transfer learning model when the application is not selected by the user,
   wherein the decompilation unit decompiles in an Android environment by removing branch processing for each operating system of APKTool.

7. The on-device Android malware detection apparatus of claim 6, wherein the base model is based on a convolutional neural network (CNN) using a two-dimensional (2D) matrix as input data.

8. The on-device Android malware detection apparatus of claim 6, wherein the base model is generated based on a permission of a manifest file or generated based on API signature information defined in the APK file.

9. The on-device Android malware detection apparatus of claim 6, wherein the communication unit communicates with the server to generate a new transfer learning model according to needs of the user.

* * * * *